(12) United States Patent
Carmichael

(10) Patent No.: US 7,256,339 B1
(45) Date of Patent: Aug. 14, 2007

(54) PREDATOR RECORDINGS

(76) Inventor: Chuck Carmichael, 420 16th St. North, Sauk Rapids, MN (US) 56379

( * ) Notice: Subject to any disclaimer, the term of this patent is extended or adjusted under 35 U.S.C. 154(b) by 630 days.

(21) Appl. No.: 10/355,983

(22) Filed: Feb. 1, 2003

Related U.S. Application Data

(60) Provisional application No. 60/354,103, filed on Feb. 4, 2002.

(51) Int. Cl.
*G10H 1/00* (2006.01)

(52) U.S. Cl. .............. 84/600; 84/603; 84/610; 84/615

(58) Field of Classification Search .......... 84/600–603, 84/609–610, 622–625, 634, 649–650, 615, 84/653, 659–660, 666
See application file for complete search history.

(56) References Cited

U.S. PATENT DOCUMENTS

| | | |
|---|---|---|
| 3,138,138 A | 6/1964 | Quittner |
| 3,317,889 A | 5/1967 | Barrand |
| 5,081,896 A * | 1/1992 | Hiyoshi et al. ............... 84/600 |
| 5,341,762 A | 8/1994 | Petersen |
| 5,349,774 A * | 9/1994 | Parra ............................ 43/9.2 |
| 5,418,518 A | 5/1995 | Schenken et al. |
| 5,515,026 A | 5/1996 | Ewert |
| 5,864,516 A | 1/1999 | Brown et al. |
| 5,977,866 A | 11/1999 | Joseph, Jr. et al. |
| 6,052,336 A | 4/2000 | Lowrey, III |
| 6,285,630 B1 | 9/2001 | Jan |
| 6,570,494 B1 * | 5/2003 | Leftridge, Sr. ........... 340/384.2 |

* cited by examiner

*Primary Examiner*—Marlon Fletcher
(74) *Attorney, Agent, or Firm*—Albert W. Watkins

(57) ABSTRACT

The movement of animals may be controlled by recording a sound which initiates movement in an animal and combining that movement initiating sound with additional sounds to produce music. A preferred embodiment uses the sound of one or more active dragonflies in combination with at least one of instrumental notes and sounds of nature to repel mosquitoes, flies and other closely related insects while attracting or entertaining humans.

19 Claims, 2 Drawing Sheets

PREDATOR RECORDINGS

CROSS REFERENCE TO RELATED APPLICATIONS

This application claims priority to U.S. Provisional Application Ser. No. 60/354,103 filed Feb. 4, 2002 and co-pending herewith.

BACKGROUND OF THE INVENTION

1. Field of the Invention

This invention pertains generally to the field of acoustic wave systems and devices, and more particular to systems used to affect the behavior of animals. In a more particular embodiment of the invention, predator sound waves are combined with other sounds to yield music which is accepted or pleasurable to mankind, and which simultaneously is useful to affect the behavior of specific animals. In an even more particular embodiment, the invention pertains to the field of mosquito or other airborne pest control, and integrates dragonfly sounds into music to repel mosquitoes while providing pleasurable entertainment to humans.

2. Description of the Related Art

For time immemorial, man has sought ways to adapt his environment in ways which are generally perceived as beneficial. The desire for making changes to one's environment are generally based upon important issues such as health and well-being.

Louis Pasteur, who is often cited as the father of modern disease theory, identified and publicized cause and effect relationship between microbiological agents and disease. This forever influenced the understanding of disease, and has continued to lead to an ever greater understanding of the vectors of disease transmission. However, understanding disease transmission is only one component of disease prevention and human health. Another necessary component is the disruption of the usual transmission vector, whereby the disease is not allowed to pass through a normal cycle.

The economic impact of unchecked disease vectors should not be underestimated. For example, while mosquitoes are perceived by many persons only as annoying pests that may induce short-term skin irritation, their affect on mankind is far more consequential. Historically in the Untied States, mosquito-borne disease presented a serious problem for early western settlers. In the late 1800's two crews were hired for each logging camp, because it was not unusual for half of the workers to be out at any one time with malaria. This mosquito-transmitted blood parasite continued to be a problem in many parts of the U.S. into the early 1950's, when it was brought under control by eliminating human sources of infection. Humans infected with the parasite are the only source of malaria infection, and with the appearance of effective drugs, window screens and a better understanding of mosquitoes and the disease, human malaria in the U.S. was eliminated. Malaria is not the only mosquito-borne disease that has caused problems in the past. In the early 1940's hundreds of cases of equine encephalitis were reported in the mid-west and west each year. It wasn't until the 1950's however that the first human cases of mosquito-borne encephalitis were recognized. Even today, human and equine cases of encephalitis are not rare occurrences.

Using the mosquito as a continuing example, this pest is a known vector for the transmission of Eastern equine encephalitis, Japanese encephalitis, La Crosse encephalitis, St. Louis encephalitis, West Nile virus, Western equine encephalitis, Rift Valley Fever, Yellow Fever, Dengue Fever, Dog heartworm, and malaria, among other diseases. In 1997, dengue was considered by some to be the most important mosquito-borne viral disease affecting humans; its global distribution is comparable to that of malaria. An estimated 2.5 billion people live in areas at risk for epidemic transmission. Each year, tens of millions of cases of dengue fever occur and, depending on the year, up to hundreds of thousands of cases of DHF. The case-fatality rate of DHF in most countries is about 5%. Most fatal cases are among children and young adults. Dengue is primarily a disease of the tropics, and the viruses that cause it are maintained in a cycle that involves humans and *Aedes aegypti*, a domestic, day-biting mosquito that prefers to feed on humans. Infection with dengue viruses produces a spectrum of clinical illness ranging from a nonspecific viral syndrome to severe and fatal hemorrhagic disease. The emergence of dengue/DHF as a major public health problem has been most dramatic in the American region. In an effort to prevent urban yellow fever, which is also transmitted by *Ae. aegypti*, the Pan American Health Organization organized a campaign that eradicated *Ae. aegypti* from most Central and South American countries in the 1950s and 1960s. As a result, epidemic dengue occurred only sporadically in some Caribbean islands during this period. The *Ae. aegypti* eradication program, which was officially discontinued in the United States in 1970, gradually eroded elsewhere, and this species began to reinfest countries from which it had been eradicated. In 1997, the geographic distribution of *Ae. aegypti* is wider than its distribution before the eradication program.

With the development of modern industry, many new and generally useful nuclear, biological and chemical compounds have been discovered or created that are known to have certain desirable characteristics, including the interruption of disease transmission vectors. Unfortunately, the history of these compounds has been checkered by unexpected side effects that are all too often disruptive in ways that ultimately lead to a completely new and unexpected problem. Examples are the early identified effectiveness of the chemical compound dichlorodiphenyltrichloroethane, commonly known as DDT, in the eradication of lice and mosquitoes.

Between the realization of the pesticidal activity of DDT during World War II and the present, competition between man and his competitors has been substantially achieved through chemical warfare. One textbook from the mid-1970's referred to these chemicals as "a complex arsenal of synthetic compounds of carbon, hydrogen, oxygen, and at least one other element such as chlorine, arsenic, mercury, sulfur, or phosphorus." Unfortunately, and as already noted, this arsenal of weapons has, over time, been determined to have adverse impact on mankind and the environment that must be considered in weighting the benefits of the compounds with the associated risks.

The Agency for Toxic Substances and Disease Registry (ATSDR), as an agency of the U.S. Department of Health and Human Services, was created to serve the public by using the best science, taking responsive public health actions, and providing trusted health information to prevent harmful exposures and disease related to toxic substances. The Comprehensive Environmental Response, Compensation, and Liability Act (CERCLA) section 104 (i), as amended by the Superfund Amendments and Reauthorization Act (SARA), requires ATSDR and the EPA to prepare a list, in order of priority, of substances that are most commonly found at facilities on the National Priorities List (NPL) and which are determined to pose the most significant potential threat to human health due to their known or suspected toxicity and potential for human exposure at these NPL sites. CERCLA also requires this list to be revised periodically to reflect additional information on hazardous substances. ATSDR ranks Lindane 33 of 275 on the 2001 CERCLA Priority List of Hazardous Substances. DDT is 12, Chlordane 19. The list is replete with these elements that were, and, in some cases, continue to be used as a part of the "chemical arsenal" which disrupts the disease vectors. Unfortunately, many of these chemical compounds are persistent, meaning they either do not degrade or do so very slowly.

Total eradication of mosquitoes responsible for bearing disease does not appear to be plausible with chemical warfare, at least not without even greater risk to mankind and the environment than the risks from the mosquito. Yet, in view of the serious health threat that these mosquito-borne diseases present to the human population, alternative ways to control the environment which do not have the recognized or potential toxicity of the chemical compounds of the past are needed. According to one visionary, "the future will depend on our wisdom not to replace one poison with another."

Nevertheless, no highly effective technique that is considered to be generally acceptable for breaking the disease vector path of the mosquito has been proposed other than the chemical arsenal described herein above. For example, at a recent national conference on techniques for avoiding the transmission of mosquito-borne illness, only rudimentary techniques were proposed that may be used to reduce one's risk for becoming infected. These techniques, which are beneficial but not total solutions, included repairing window screens, removing heavy brush and trees, emptying small containers, regularly changing the water in vases, pot plants, bird baths, pets' containers and any other receptacles which hold water, keeping swimming pools chlorinated or salted, or emptying them completely when not in use for long periods, emptying children's wading pools regularly, and opening clogged drainage ditches. Other listed techniques for reducing risk include avoiding exposure at dusk and dawn, when mosquitoes are more active; wearing long, loose clothing; using a repellent such as N,N-Diethyl-M-Tolumide (DEET) Compound; using sprays, coils and vaporising devices to kill mosquitoes; using mosquito netting including possibly treating the nets with a repellent/insecticide; flushing unused toilets once a week; keeping drains and roof guttering in good repair and free of leaves and debris; keeping fish ponds stocked with fish; ensuring that tanks have close-fitting tops, lids, covers and inlet pipes to exclude mosquitoes, and screening all water inlets and the outlet end of overflow pipes. What is desired then is a way to assist with the control of the environment while not introducing further risks that may, as yet, be unknown to those within the controlled environment.

Acoustic waves have been used in the prior art to control an environment without consequential and long-term alteration. The fundamental precept of this technique is that there are certain sounds that are irritating to one or more species within the animal kingdom, and that these certain sounds may be used to selectively drive those species from an area. While the precept is correct, several factors have prevented widespread effective use of acoustic systems. One factor is a general lack of sounds that are selective to only one or a few species. In other words, and for exemplary purposes only, ultrasonic repellants have been designed which are intended to repel various rodents and flying insects. The ultrasonic adjective is used to identify that the sound waves are of higher frequency than normally detected by the human ear. Exemplary of these concepts are U.S. Pat. Nos. 5,341,762 to Petersen, which is designed for pest control, and 5,418,518 to Schenken et al, which is designed to provide a warning signal to deer and the like of an oncoming vehicle. Other species are responsive to sonic waves, such as shown in 3,317,889 to Barrand, which discloses vibrational waves in water of between 100 and 14,000 Hertz to drive sharks from an area. Each of these patents are designed to use sound waves to control an environment for the benefit of people.

Unfortunately, ultrasonic sounds may irritate or even deafen certain desired animals that are also sensitive to sounds in the same acoustic spectrum as used to deter a pest. It is well-known, for example, to use an ultrasonic horn as a deterrent during dog training, owing to a dog's elevated sensitivity to sounds within the ultrasonic spectrum. Furthermore, many rodents which are common house pets are also sensitive to ultrasound. Consequently, the overlap of detectable spectrum among desired and undesired animals has presented an obstacle in the prior art to successful use of acoustic control. This is especially true of the Petersen technology, where the desired sound pressure levels are extremely high.

Compounding the problems that limit ultrasonic pest control is an awareness that certain pests will become immune, or deaf, to continuous high volume ultrasonic sounds. Inventions such as the Quittner horn of U.S. Pat. No. 3,138,138 seek to overcome this limitation by providing intermittent activation of the acoustic wave. Nevertheless, the volumes required are difficult to produce and maintain in an area sufficient to adequately deter pests, and the probability of the pest becoming "immune" to the sound is relatively great.

Where the desired animal behavioral control spectrum overlaps that of human hearing, the sounds of the controlling device are known to be annoying and irritating to people as well as pest, and so are unacceptable for most purposes. Examples of this type of system are U.S. Pat. Nos. 5,977,866 to Joseph, Jr. et al, 5,864,516 to Brown et al, and 5,515,026 to Ewert. In the Joseph patent, chaotic noises are used to discourage birds from entering the area of an airfield. While the system may perform well for the airfield, where few persons will be found and where most persons will be wearing ear protectors, in ordinary locations occupied by persons this system would prove irritating and unacceptable. Two additional patents, U.S. Pat. No. 5,349,774 to Parra and U.S. Pat. No. 6,285,630 to Jan, illustrate the use of predator sounds to discourage a species which is prey to the predator from entering the area. Unfortunately, the sound of a predator such as a shark or hawk is not associated with enjoyment by most persons, nor would continuous exposure to repeated predator sounds be anticipated to be well received by most persons.

SUMMARY OF THE INVENTION

In a first manifestation, the invention is an apparatus for repelling an animal while simultaneously entertaining a human. The apparatus includes an auditory signal replicating an acoustic signal emanating from a predator of the animal; a sequence of sounds that when acoustically reproduced in tandem with the auditory signal produces a musical composition; and a means for acoustically reproducing the musical composition in the presence of the animal and the human.

In a second manifestation, the invention is a method for selectively initiating movement of an animal species with respect to a sound reproducer, without damaging or consequentially altering a habitat. An animal species to be affected is selected, and a natural acoustic source which selectively affects the animal species movement is identified. At least one sound recording is made of the natural acoustic source. The at least one natural acoustic source recording is mixed with at least one musical recording and then stored, followed by reproduction of the mixed recording in the presence of the selected animal species.

In a third manifestation, the invention is a method suited to selectively repel mosquitoes from a region without leaving physical or chemical residue within a habitat while simultaneously creating an attractant for humans. A sound of an active dragonfly is recorded and then associated with a musical score. The sound recording and musical score are stored and later reproduced to provide music.

OBJECTS OF THE INVENTION

Exemplary embodiments of the present invention solve inadequacies of the prior art by providing a method and apparatus suited to stimulate movement of animals selectively without damaging or consequentially altering a habitat. The method generally includes the steps of selecting an animal species, identifying a stimulating source such as a natural predator, making a sound recording of the stimulating source, mixing the sound recording(s) with musical recording(s), storing mixed recording(s), and reproducing the mixed recording(s).

A first object of the invention is to provide a means and method for repelling, or, in an alternative embodiment, attracting an animal without altering the surrounding environment. A second object of the invention is to enable specific targeting of animal species which will be affected. Another object of the present invention is to provide a low-cost and readily usable method and apparatus for the repulsion of undesirable animals which capitalizes on common electronic components owned by many persons. A further object of the invention is to accomplish the foregoing objectives while further enhancing the aesthetic appearance of a location through artistic design. Yet another object of the present invention is to enable small, compact, portable apparatus which may be used by persons of all types and abilities.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides an apparatus and method for repelling certain undesirable pests or alternatively attracting certain desirable species. The pests are most preferably repelled in a harmless and non-toxic way, which simultaneously preserves the environment and protects the safety and well-being of a user of the pest repellent apparatus and method. In the most preferred embodiments, the repellent or attractant is masked from human perception by using one or more novel techniques. Consequently, in accord with the teachings of the present invention, certain pests may be repelled harmlessly and without distracting or disrupting humans from normal activities.

Figure 1:
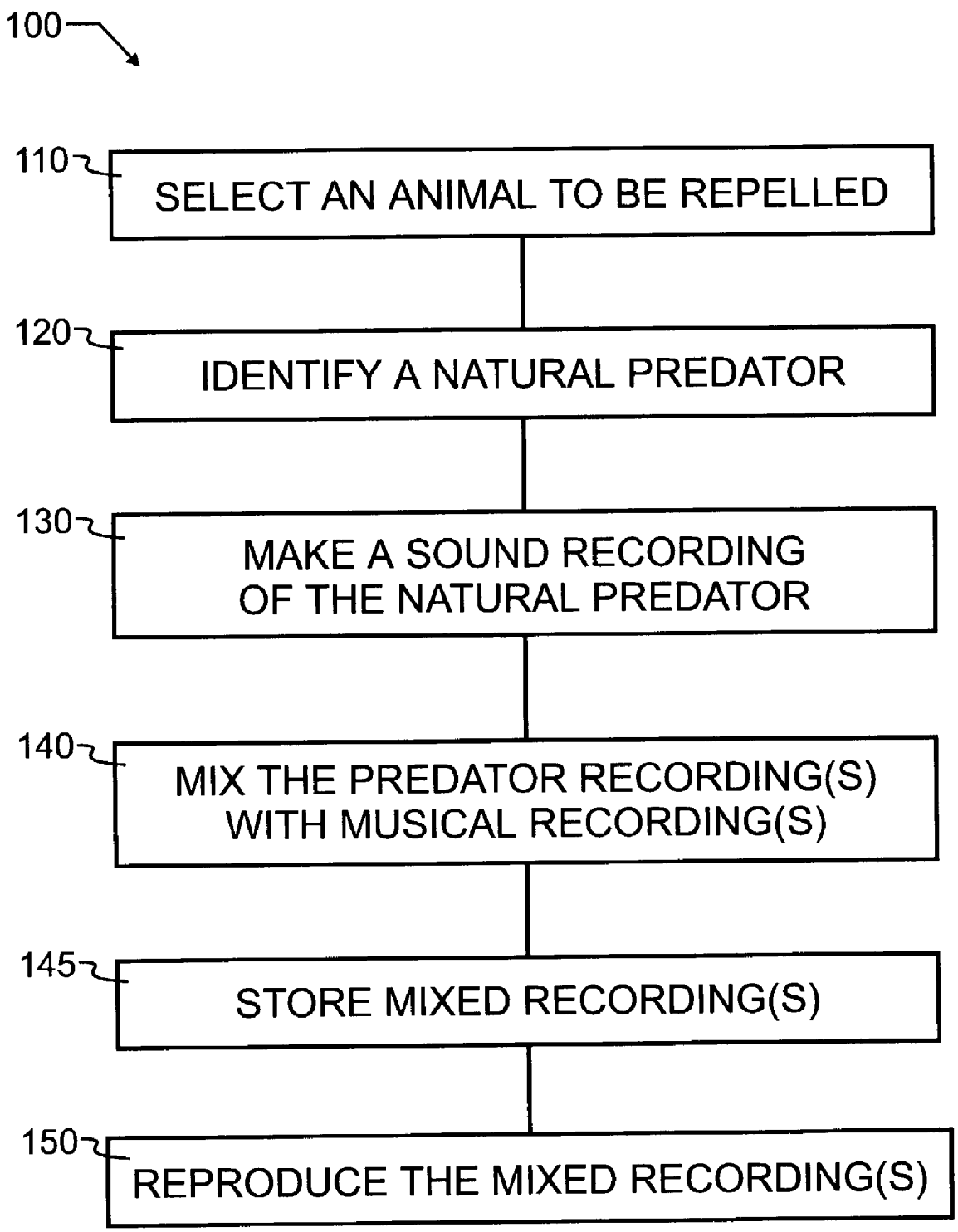
FIG. 1 illustrates a preferred method of repelling an animal.
Figure 2:
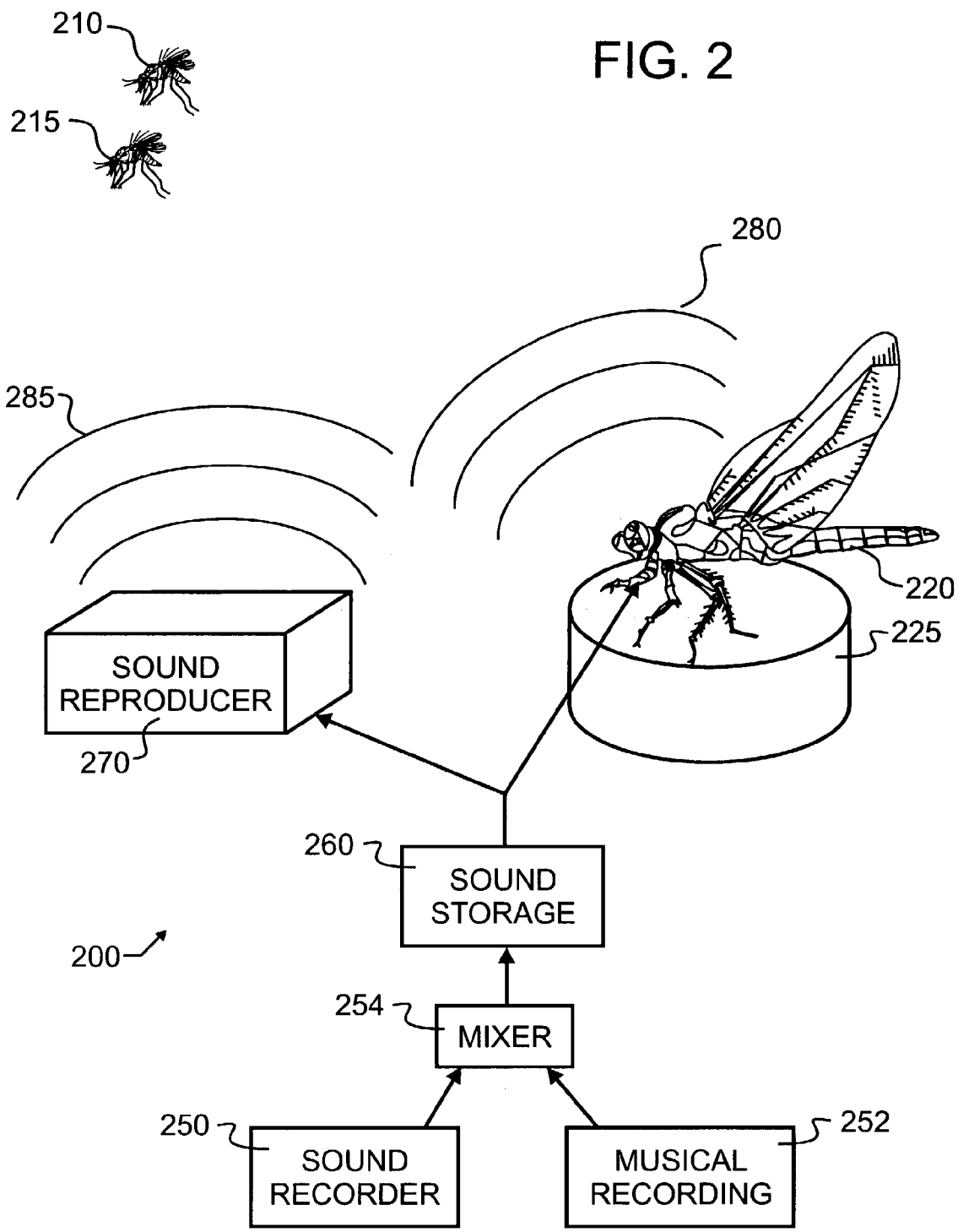
FIG. 2 illustrates a preferred apparatus by block and schematic diagram.

One preferred embodiment repelling method 100 as illustrated in FIG. 1, using apparatus 200 illustrated in FIG. 2, comprises the step 110 of selecting an animal 210, 215 to be repelled. For the purposes of this disclosure, it will be understood that "animal" is defined herein as any living being capable of sensation and the power of voluntary motion. In the next step 120, a natural predator 220 to the selected animal 210, 215 is identified. For this repelling method 100 to have utility, the identified predator 220 must be one which generates a sound that is distinguishable by animal 210, 215, and to which animal 210, 215 has particular sensitivity. In some animal species, there are very highly developed acoustic sensors that are particularly sensitive to sounds specific to one type of predator. When there exists such an arrangement of sensitivity to sounds specific to a predator, the present invention may be readily adapted for application to the repelling of that animal.

A sound recording of predator 220 is made using sound recorder 220 in step 130. Most preferably, this recording will be of sufficient quality to preserve the acoustic characteristics to which animal 210, 215 is sensitive. For many audible and lower ultrasonic frequencies, the quality afforded by a digital audio recording similar to that used in the creation of compact discs or the like is desirable. Nevertheless, other recording techniques and equipment will be readily apparent to those skilled in the art of acoustics, so long as the resultant signal is still sufficiently identifiable as to be effective on the intended animal 210, 215.

In order to prevent the present invention from disturbing humans, the predator recording produced by sound recorder 250 is then mixed using mixer 254 with at least one musical recording 252 in step 140. The particular mixing technique is not consequential to the invention, and may be an auditory mixing, electronic mixing, overlaying of notes or tones, a simultaneous electronic generation, time association of electronic files, or any of the other myriad of known techniques for ultimate simultaneous reproduction of sounds.

Musical recording 252 will most preferably conceal, mask or otherwise render acceptable the sounds of the predator to humans, who are not prey to the predator. Many animals have an innate sensitivity to the sounds of predators which prey upon them, whether or not additional sounds are present. Consequently, the predator sound acts as a natural repellant to animal 210, 215, even when mixed with musical recording 252. It is noteworthy at this point that by combining signals, the present invention contemplates the application of the teachings herein to the repelling of one species accompanied by the simultaneous attraction of another species. In the preferred embodiment, the predator sound of a dragonfly serves as the repellant to a mosquito, while the musical recording serves as an attractant to humans.

The recordings produced in this preferred embodiment may be mass-produced for a relatively low cost. These same recordings may then be reproduced in step 150 using sound reproducer 270 selected from a wide variety of music and sound systems. With the prevalence of high quality sound reproduction systems, such as the "CD audio" systems that have wide audio bandwidth with very low distortion, the reproduction equipment required to reproduce many predator sounds is already present in most households and businesses. Alternative methods of reproduction are certainly contemplated herein, including the use of various computer control signals and encoding schemes, such as the widely known and available MIDI techniques.

While the present invention is not limited to a single predator sound, in a most preferred embodiment of the invention the beating of dragonfly wings is a preferred predator sound. This sound is desirably blended with a musical recording, which will cause the dragonfly sound to be removed from perception by many people. However, mosquitoes 210, 215 are much more sensitive to the beating sound of the dragonfly wings, and the music that acts as a mask for humans does not reduce the repulsiveness of the dragonfly sound to mosquitoes 210, 215. Consequently, mosquitoes 210, 215, which have an innate sensitivity to the sound of dragonflies in flight, will have a strong tendency to avoid this sound. They are therefore repelled, while a human may never be aware of the existence of the repellent. The predator-prey relationship of the dragonfly to mosquitoes, gnats, wasps, and flies enables the dragonfly sound to act as an insect repellent for a large number of insects, though, as aforementioned, any particular insect must have an innate sensitivity to the sounds produced by the dragonfly.

When selecting a specific predator from which to obtain a recording, one factor which is important is the necessary, optimum or desired frequency of interest to repel the pest effectively. Most desirably, this frequency will be well within the capabilities of most typical home sound systems. An additional factor is the volume level or sound pressure level required to adequately repel the pest. This sound pressure level will desirably not overshadow the music which would preferably be heard by humans. Predator sounds which either require frequencies or bandwidth greater than readily available through typical sound systems, or which require volume levels which are so great as to block out any other sounds, would be less desirable. Presently contemplated predator sounds, for exemplary purposes and not limiting to the invention, include the aforementioned dragonfly and also snakes, dogs, male mosquitoes and other predators or repellants or attractants, the range limited only by situations where one species or type responds to the sounds of predators.

The musical recording 252 selected for mixing with predator sounds is not critical to the invention, and those skilled in the art of sound mixing will identify many suitable selections. For the purposes of this disclosure, music will be herein defined to be more than the sole sound of a predator, and will include combinations of sounds or sequences of notes in patterns generally pleasing to the ear. Since it is most preferable that the sound be reasonably well masked, music which has large gaps of silence may be more difficult to use. Sounds such as nature recordings may serve to disguise a specific natural sound, such as the dragonfly sound, as one of the natural sounds in the music. Nature recordings can work particularly well where it is not possible to completely mask a predator sound, but where the sound will nevertheless blend well into other natural sounds.

The invention is not limited to a specific sound storage medium. The requirement for the storage medium used in association with a particular embodiment is that the storage medium accommodate the desired frequencies of interest and any dynamic range requirements that there might be. Consequently, sounds may be stored on a variety of storage media including compact discs, minidisc, DVDs, flash memory cards, hard drives or other storage devices. The sound signal may be stored in a digital or analog format, and so more traditionally analog media such as audio and video tapes and vinyl records would also be suitable media for some predator sounds. The medium will only be limiting where there is a particular predator sound that requires bandwidth or dynamic range greater than available for storage in some of the media. While the sound will normally be recorded and stored on a fixed medium in step 145, at the time of distribution the sounds may even be broadcast from a radio station, satellite or other transmitter. Once again, the transmitter must accommodate the necessary bandwidth and dynamic range.

Sound reproducer 270 is likewise typically not critical to the invention, provided reproducer 270 meets the bandwidth and sound pressures determined to be important for successful repelling of an intended pest. Sound reproducer 270, for exemplary purposes only and not limiting to the invention, may include portable players such as MP3 players, CD players, tape recorders and portable radios, and may also include fixed equipment such as home or commercial stereo systems, automotive sound systems, and any other sound reproduction device which meets the aforementioned sound reproduction requirements. In the cases of predators having somewhat more demanding auditory reproduction requirements, systems may be provided which are specialized and more costly. In these instances, it is conceived that such systems may be made available not only for purchase, but also for rental to enable the distribution thereof.

An important consideration in the design and layout of sound reproduction components such as sound reproducer 270 and 220 is the need for complete sound coverage. When a sound emanates from a single source or direction, there is a tendency for objects to act as barriers which cast a "shadow". Consequently, animals such as mosquitoes may take refuge in areas that are shadowed from the acoustic energy if only a single sound reproducer is used. FIG. 2 illustrates the use of two sound reproducers, but it will be understood from the present disclosure that as many sound reproducers such as reproducers 270 and 220 may be included as desired. An ideal combination is found in commercially available surround sound systems, which will typically use four to six acoustic transducers at various spaced locations. The use of these multiple transducers helps greatly to reduce or eliminate the acoustic shadowing effect.

As described herein above, sound recordings represent a most preferred embodiment of the invention owing in part to low manufacturing costs, which enables wider distribution of the recordings and also a wider variety of predator sounds to be distributed. The ready availability of high quality audio systems enables a wide range of predator sounds to be faithfully reproduced using equipment already found in many homes, and so the invention may be used to reproduce predator sounds from a variety of predators.

Nevertheless, and in accord with the teachings of the present invention, other techniques besides sound may be used to emulate a predator and ward off pests. These alternative techniques may be used separately from the sound recordings, or they may be used in further combination with the sound recording. In a most preferred, but still exemplary embodiment, a visual deterrent such as a replica 220 of the predator may be used separately from or alternatively combined with an auditory signal 280. In the particular preferred embodiment case of the dragonfly recording, the recording may in an alternative embodiment emanate from a carefully crafted and yet decorative dragonfly model 220 resting on a surface 225 or otherwise located, supported or suspended. Dragonfly replicas have long been sold as works of art for use in decoration, and so dragonfly replica 220 will appear to the human eye to be only a decoration. Replica 220 is consequently relatively masked from human perception as a pest repellent. However, replica 220 may also serve to enhance the repulsion of mosquitoes 210, 215 or other pests.

Depending upon the pest 210, 215 to be repelled, the auditory or visual components may be more important, as will be readily determined by those skilled in the art when considered in light of the present disclosure. Furthermore, various enhancements may be made where appropriate to the replicas. Once again for exemplary purposes but not limited to the descriptions provided herein, the dragonfly wings may be manufactured from a thin and shiny plastic material such as cellophane or the like, which will tend to reflect like much like the dragonfly wing. Furthermore, the wings may be made to move or beat in a manner visually resembling a living dragonfly. As should be apparent from the present disclosure, there is little limiting the application of this technology in the repelling of pests, other than the awareness of a particular relationship between a specific pest and associated predators. Once the sound and visual characteristics are known for a pest and the pest's perception of predators, a pest specific repellent may be crafted from sounds and appearance which is masked from human perception.

The present invention is contemplated to offer a wide variety of benefits at relatively low cost using readily available recording and distribution equipment. Where desired, the preferred embodiment sound recording may be enhanced by somewhat more costly implementations in physical replicas or repellents, and even other sensory repellents. The benefits obtainable from a well-conceived embodiment of the present invention include the preservation of a natural environment through the co-existence of humans with their surroundings. The current need for extensive pesticide application threatens many species of birds and animals as well as humans, but has heretofore been considered a necessary evil in order to prevent the spread of disease and avoid the inconvenience of large pest infestations. In this reference, pesticide will be understood to include more than insecticide, and extends to poisons and the like used on rodents and other pests. Through the use of the present invention, the need for such aggressive application of pesticide is diminished. Furthermore, in settings where such application of pesticide has proven relatively ineffective, including lawn parties, picnics, golfing, boating, fishing, camping, swimming, walking, hiking, in park shelters, at stadiums, for livestock control and other situations too numerous to mention, the present invention offers a safe and effective alternative. Other applications and benefits to society include the usage of the present invention by those persons otherwise relatively more vulnerable to pests, such as persons who may be bound to a wheelchair, and the use during military excursions or the like in places beyond the reach of traditional pesticide application. It is important to note that the present invention does not only repel pests, but additionally offers comfort and enjoyment through the artistic presentation that is achieved by the most preferred embodiments, such as the listening pleasure of the music and the visual stimulation of the predator replicas.

While the foregoing details what is felt to be the preferred and additional alternative embodiments of the invention, no material limitations to the scope of the claimed invention are intended. The possible variants that would be possible from a reading of the present disclosure are too many in number for individual listings herein, though they are understood to be included in the present invention. As one example, it will be apparent that the preferred and alternative embodiments refer primarily to repellents. This does not imply that the teachings of the present invention are so limited, and it is conceived that the techniques illustrated herein may further be applied to attract desirable species, while the attractant is masked from human conscious awareness. Further, features and design alternatives that would be obvious to one of ordinary skill in the art are considered to be incorporated also.

I claim:

1. An apparatus for repelling an animal while simultaneously entertaining a human, comprising:
    an auditory signal replicating an acoustic signal emanating from a predator of said animal;
    a sequence of sounds that when acoustically reproduced in tandem with said auditory signal produces a musical composition;
    a means for storing said auditory signal with said sequence of sounds for electronic reproduction of said musical composition on demand; and
    a means for acoustically reproducing said musical composition in the presence of said animal and said human.

2. The repelling apparatus of claim 1 wherein said storing means is selected form the group comprising optical storage, magnetic storage, solid-state semiconductor storage and combinations thereof.

3. The repelling apparatus of claim 1 wherein said acoustical reproducing means further comprises a replica of a predator in combination with a sound reproducer.

4. The repelling apparatus of claim 1 wherein said sequence of sounds further comprises nature background sounds.

5. The repelling apparatus of claim 1 wherein said sequence of sounds further companies a musical composition.

6. A method for selectively initiating movement of an animal species with respect to a sound reproducer without damaging or consequentially altering a habitat, comprising the steps of:
    selecting an animal species to be affected;
    identifying a natural acoustic source which selectively affects said animal species movement;
    making at least one sound recording of said natural acoustic source;
    mixing said at least one natural acoustic source recording with at least one musical recording;
    storing said at least one natural acoustic source recording and said at least one musical recording; and
    reproducing said mixed recording in the presence of said selected animal species, and, responsive thereto, initiating movement therein.

7. The method for selectively initiating movement of an animal species of claim 6 wherein said natural acoustic source repels said animal species from said sound reproducer.

8. The method for selectively initiating movement of an animal species of claim 6 wherein said natural acoustic source attracts said animal species to said sound reproducer.

9. The method for selectively initiating movement of an animal species of claim 6 wherein said natural acoustic source further comprises a sound produced by an active natural predator of said animal species.

10. The method for selectively initiating movement of an animal species of claim 6 wherein said reproducing step occurs in the presence of a human and responsive thereto attracts said human to said sound reproducer.

11. The method for selectively initiating movement of an animal species of claim 6 wherein said storing step further comprises recording said mixed recording onto a compact disc compatible with commercial audio CD players.

12. The method for selectively initiating movement of an animal species of claim 6 wherein said natural acoustic source further comprises an active dragonfly.

13. A method suited to selectively repel mosquitoes from a region without leaving physical or chemical residue within a habitat while simultaneously creating an attractant for humans, comprising the steps of:
    making a sound recording of an active dragonfly;
    associating said active dragonfly recording with a musical score;
    storing said sound recording and said musical score; and
    reproducing said sound recording and said associated musical score to produce music.

14. The method of selectively repelling mosquitoes of claim 13 wherein said step of associating further comprises electrically mixing said sound recording with said musical score to produced a mixed composite electrical signal.

15. The method of selectively repelling mosquitoes of claim 14 wherein said step of storing said sound recording and said musical score further comprises storing said mixed composite electrical signal.

16. The method of selectively repelling mosquitoes of claim 15 wherein said step of storing further comprises recording said mixed composite electrical signal onto a compact disc.

17. The method of selectively repelling mosquitoes of claim 16 wherein said step of reproducing further comprises:
    playing said compact disc in a CD player to produce a mixed composite electrical signal; and
    converting said mixed composite electrical signal into an audible sound wave.

18. The method of selectively repelling mosquitoes of claim 13 wherein said musical score further comprises nature sounds.

19. The method of selectively repelling mosquitoes of claim 13 wherein said musical score further comprises sequences of instrumental notes.

\* \* \* \* \*